United States Patent [19]

Smith

[11] Patent Number: 5,018,192
[45] Date of Patent: May 21, 1991

[54] UTILITY METER TO TELEPHONE LINE INTERFACE

[75] Inventor: Thomas J. Smith, Bay Shore, N.Y.
[73] Assignee: TII Industries, Inc., Copiague, N.Y.
[21] Appl. No.: 425,302
[22] Filed: Oct. 23, 1989
[51] Int. Cl.⁵ .......................................... H04M 11/00
[52] U.S. Cl. .................................... 379/107; 379/106; 379/399
[58] Field of Search ............... 379/399, 412, 413, 387, 379/106, 107

[56] References Cited
U.S. PATENT DOCUMENTS 4,540,849  9/1985  Oliver ................................. 379/107
4,800,588  1/1989  Poster, Jr. ........................... 379/399

Primary Examiner—Jin F. Ng
Assistant Examiner—Stella L. Woo
Attorney, Agent, or Firm—Sachs & Sachs

[57] ABSTRACT

A telephone line to utility meter interface for use in connecting a telephone line pair to a plurality of utility meters, includes a weather sealed and lockable housing with a telephone line cord plug and receptacle and a terminal block disposed therein. The incoming telephone line pair may be isolated from the utility meters for testing, via the insertion of a known operating telephone having a standard telephone plug into the receptacle within the housing which is integrally molded into the terminal block. The terminal block also includes integrally molded test cable retainer. The utility meters may individually be interrogated by the aid of electrical interrogation circuitry activated by a specific electrical signal appearing on the subscriber telephone line.

7 Claims, 2 Drawing Sheets

UTILITY METER TO TELEPHONE LINE INTERFACE

BACKGROUND OF THE INVENTION

1. Field of the Invention

The present invention relates to telephone interface apparatuses, and more particularly, to a utility meter to telephone line interface which permits isolation of the utility meter lines from the incoming telephone lines in order to isolate problems appearing on the telephone line and permit individual interrogation of each utility meter individually.

2. Discussion of the Relevant Art

It is the common practice of utility companies, such as suppliers of electric power, water and natural gas to install meters for monitoring usage in the homes of their customers. The quantity of service consumed is typically ascertained by periodic inspections by utility company employees who read these meters and make note of the dial or numeric readout. A comparison of the last reading with the present reading yields the amount of service consumed in the interim.

Traditionally, the utility company employee travels to the subscriber's home where the meter or a remote indicator is located, e.g., attached to an exterior wall of the house or mounted on a basement wall. Needless to say, this procedure requires substantial time, inconvenience and expense.

At the present time, utility companies would like to use telephone lines to monitor subscriber usage. However, all electrical and mechanical systems are subject to failure due to internal degradation/malfunction or to external causes. For this reason, it is advisable to be able to isolate components of a system for testing. In the case of a remote utility meter reading system two of the basic components requiring test verification are the utility meter itself and its associated interrogation circuitry and the telephone connection from the subscriber's house to the utility company. In general, the simplest method of testing the telephone line is to connect a telephone which is known to be working to the subscriber end of the line and place and/or receive a call with that telephone.

Most modern telephones employ a standard receptacle and plug for conveniently connecting and disconnecting from the telephone company's incoming telephone subscriber line pair.

The present apparatus includes an interface between an incoming telephone line and a utility meter and its interrogation circuitry. The present invention employs a receptacle and plug for maintaining electrical continuity between the meter and the incoming telephone line when in normal use. The receptacle and plug of the present apparatus may be disengaged for the purpose of testing the incoming telephone line by inserting the plug of a telephone, which is known to be working, into the receptacle of the interface and placing and/or receiving a telephone call.

One method disclosed in the instant invention requires a meter capable of being read, after being interrogated, via a telephone line. This method requires a call to be placed to the meter to be read. Upon receiving the telephone interrogation signal with the proper identification, the meter responds by generating an electrical signal or connects an impedance across the telephone line that is proportional to the amount of the utility utilized which is monitored by the caller. In this manner, the meter may be read from a remote location without traveling to the subscriber's house.

The most pertinent prior art is a Utility Interface Device designed and manufactured by TII Industries, Inc., disclosed in U.S. Pat. No. D299,130. This device utilizes a commercially available telephone receptacle which was conventionally installed in the terminal block of the device. This device utilized a commercially available telephone receptacle which was conventionally installed in the terminal block of the device. This device retains the cable supplying continuity between the telephone line pair and the utility meter with a standard cable retaining grommet.

Applicant is not aware of any other devices that disclose a utility meter to telephone line interface which has a receptacle housing and cable retaining means that are integrally molded into the terminal block and provides for individual interrogation of a plurality of utility meters.

SUMMARY OF THE INVENTION

Therefore, it is an object of the present invention to provide a utility meter to telephone interface apparatus employing an integrally molded receptacle housing and cable retaining means which is simpler in structure, easier to manufacture, and more economical than prior devices.

It is another object of the present invention to provide an interface which includes a cable retaining device which effectively retains the internal cable but permits easy removal and adjustment thereof.

It is still yet another object of the present invention to provide a utility meter to telephone line pair interface which is simpler to install than previous devices. It is also an object of the present invention to provide a means for isolating trouble on the telephone line from trouble in the subscriber's equipment.

It is yet another object of the present invention to provide a utility meter to telephone line pair interface which permits the individual interrogation of a plurality of utility meters.

A utility meter to telephone line interface, according to the principles of the present invention, comprises in combination; a hollow housing having a closed end and an open end; a cover adapted to cooperate with the housing open end, the cover being hingedly connected to the housing along one edge of the housing open end; a first opening in the housing is adapted to receive at least one telephone line and one utility meter line pair; a removable terminal block is disposed within the hollow housing. The terminal block has an integrally molded telephone receptacle housing having two open ends, and is adapted to receive and removably retain a mating telephone plug having conductive pins disposed on the distal end of a plug-in telephone line cord having at least two terminals in the first open end and a pin carrier block having a plurality of conductor pins disposed in the second open end, the receptacle housing is adapted to hold the conductor pins in electrically conductive contact with the telephone plug conductive pins when the pin carrier block and the telephone plug are mated. Also wire connections are provided for electrically connecting at least two of the receptacle conductor pins to at least a pair of telephone station line terminals disposed on the rear surface of the terminal block which are adapted to receive the subscriber telephone line pair. The terminal block has at least two utility line terminals disposed therein which are adapted to receive a utility line pair. A first cable has a plurality of line pairs therein. Each one of the line pairs are connected to a pair of utility meter terminals on one end and are connected on the other end to a pair of utility line terminals disposed on the terminal block. A second cable has a plurality of line pairs therein. One end of each of the line pairs are connected to respective pairs of utility terminal pairs, the other end of the second cable terminates in a telephone plug so that when the plug is placed in the receptacle the telephone line pairs are continued. The housing is provided with a lip having an opening therein extending from an edge of the housing major opening and a lip having an opening therein extending from the hinged cover aligns with lip opening of the housing when the hinged cover is in the closed position.

The foregoing and other objects and advantages will appear from the description to follow. In the description reference is made to the accompanying drawing which forms a part hereof, and in which is shown by way of illustration a specific embodiment in which the invention may be practiced. This embodiment will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with references to the accompanying drawing in which.

DESCRIPTION OF PREFERRED EMBODIMENT

Figure 1:
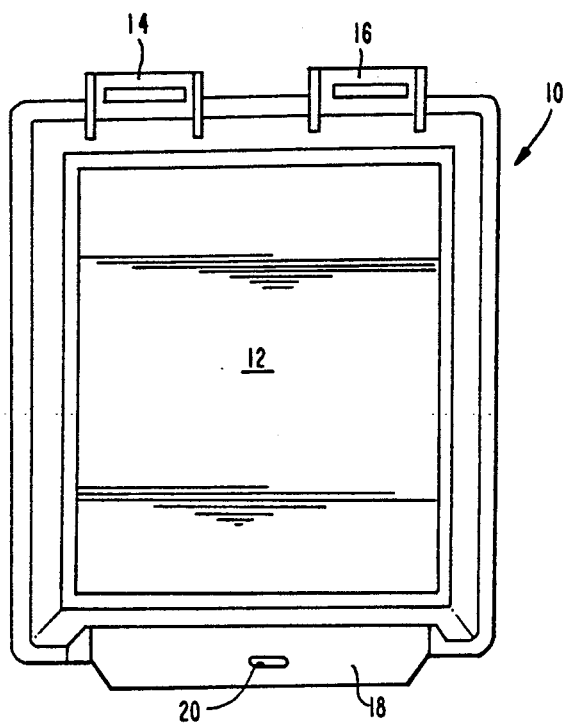
FIG. 1 is a top view of a telephone line to utility meter interface, in accordance with the principles of the present invention.

Referring now to the figures, and in particular to FIG. 1, there is shown a top view of a utility meter to telephone line interface 10, according to the principles of the present invention. The top cover 12 of the interface 10 is preferably provided with a pair of hinges 14 and 16 disposed on one edge thereof, and an extending lip portion 18 disposed on the opposite edge of the top cover 12. The extending lip portion 18 is provided with a lock opening or aperture 20.

Figure 2:
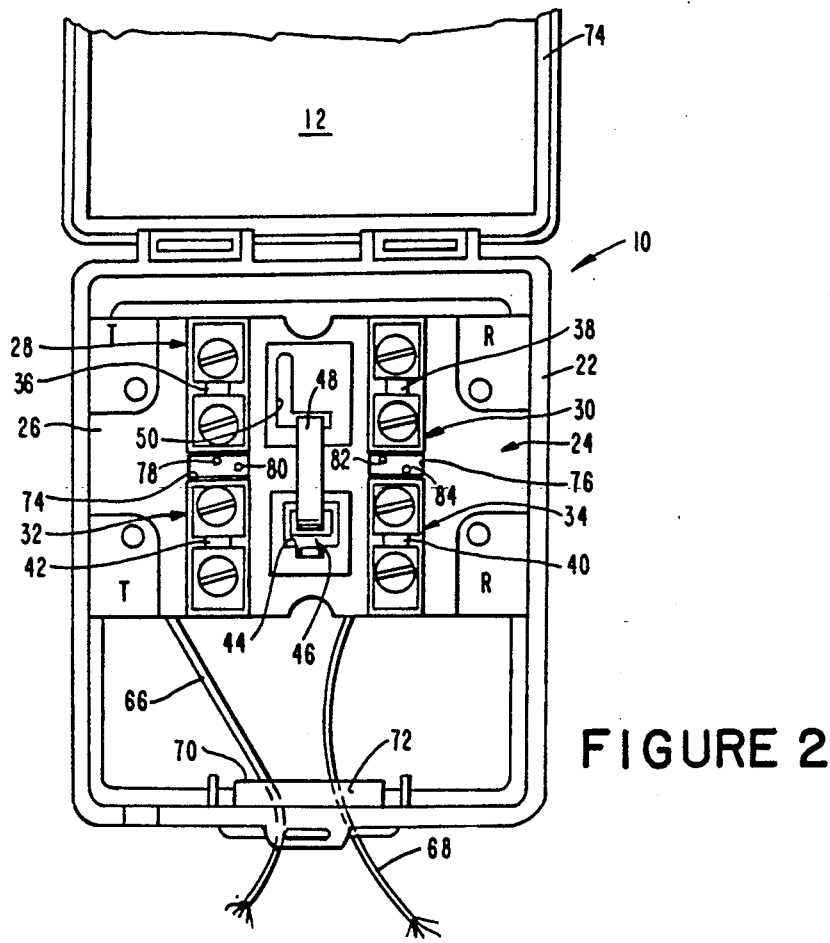
FIG. 2 is a top view of the interface with the top cover open and a terminal block exposed.

FIG. 2 discloses the interior of the interface 10, with the cover 12 shown moved to the open position. The hollow base or housing 22 includes a terminal block 24 disposed therein. The terminal block 24 may be affixed to the housing or base 22, by screws or other conventional means, not shown. Appearing on the front surface 26 of the terminal block 24 are a plurality of terminal pairs 28, 30, 32, and 34. Each of the terminal pairs 28, 30, 32 and 34 are connected together by means of a shorting link 36, 38, 40, and 42, respectively, Terminals 28, 30, 32 and 34 are independent and each may receive a single independent wire from utility meters 60, 62 or 64 (shown in FIG. 4), if required for proper operation or may utilize a dual pair of terminals 28 and 30 (tip and ring) when two pairs of wires are required for proper operation.

The terminal block 24 is also provided with a telephone receptacle or jack 44, which is adapted to receive a conventional telephone plug 46 disposed on a distal end of a test cable 48, which protrudes from a L-shaped opening 50 provided in the terminal lock 24. The other distal end of cable 48 is connected to utility line terminals 28, 30, 32, and 34. When the telephone plug 46 is inserted or mated with the telephone receptacle 44 the electrical conducting path from the terminals 28, 30, 32, and 34 are continued, via the contacts provided in the telephone plug 46 and receptacle 44. The contacts or connector pins 51, and 55; are connected to terminal 58 and pins 53 and 57 are connected to line terminal 56 disposed on the rear surface of the terminal block 24 (See FIG. 3).

The cables 66 and 68 enter the interface 10, via the base of housing 22 through an opening 70 into which is placed a flexible grommet 72. The grommet 72 is designed to fit snugly around the cables 66 and 68 to have the interface generally resistant to the atmospheric humidity. A gasket 74 may be placed around the periphery of top cover 12 so that when the top cover 12 is closed upon the base or housing 72 a weatherproof seal is also formed.

The interior surface of top cover 12 may include indicia thereon (not shown), that may be used to identify which particular terminals have been connected to which type of utility meter.

Figures 3, 4:
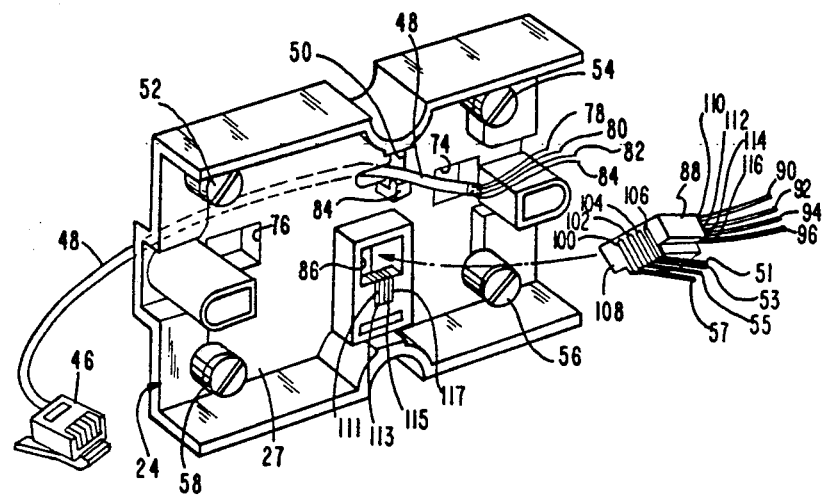
FIG. 3 is an exploded perspective view of the rear of the terminal block.
FIG. 4 is a block diagram of the circuit arrangement, according to the principles of the present invention.

FIG. 3 discloses the rear surface of terminal block 24. The end of cable 48, which includes a plurality of wires 78, 80, 82 and 84, that must be connected to the terminals 28, 30, 32 and 34, are fed through openings 74 and 76 provided in the terminal block 24 (See FIG. 2).

Cable 48 is passed through the L-shaped opening 50 and is distorted from its free curvature by a protruding member which functions as a cable retainer 84, which is generally L-shaped and integrally molded into the terminal block 24 and by frictional contact distorts the cable 48 locking it and retaining it in position when it is forced into the L-shaped portion of opening 50 over which protrusion 84 extends.

The telephone receptacle or jack 44 is integrally molded into terminal block 24, includes an opening 86 adapted to receive a pin carrier block 88 and is shaped to receive the conventional telephone plug therein when inserted from the front surface 26 of terminal block 24. The pin carrier block 88 is inserted from the rear surface 27 and includes a plurality of connector pins 51, 53, 55 and 57 which when inserted into opening 86 completes the conductive path between the conductors of plug 46 and the pins 51, 53, 55 and 57 to which is connected the telephone line wires 90, 92, 94 and 96 respectively, (see FIG. 4) connected to terminals 56 and 58 which as explained earlier, are connected to the incoming telephone lines entering the system, via a cable 68. Terminal block 88 is provided with a plurality of through apertures 100, 102, 104 and 106 into which is inserted connector pins 51, 53, 55, and 57, respectively. One end of the pins 51, 53, 55, and 57 extend through the apertures 100, 102, 104 and 106 and have connected thereto, in a conventional manner wires 90 92, 94 and 96, which are connected to the telephone terminals 56 and 58 as stated earlier. The other end of pins 51, 53, 55 and 57 are bent at an angle which is parallel to the front surface 108 of pin carrier block 88 and then angle toward the rear surface 110 of terminal block 88 at approximately a 45 degree angle where they are adapted to rest in channels or grooves 110, 112, 114 and 116 provided in pin carrier block 88. Channels 110, 112, 114, and 116 are aligned with cooperating channels 111, 113, 115 and 117 provided in opening 86 when inserted into opening 86 so that they will come into contact with the conductive elements of plug 46 when plug 46 is inserted into aperture 86 from the front surface of the terminal block 24, thereby continuing the electrically conducted path as stated earlier.

Referring now to FIG. 4 there is shown a plurality of utility meters 60, 62 and 64 which may be an electric power meter such as a wattmeter, a water meter or gas meter, respectively. Each of these meters are provided with an interrogation apparatus 118, 120 and 122 which in turn is connected to the utility interface, via the cable 66 and will be connected to terminal pairs 36, 38 and 40 respectively. When cable 48 is inserted, via plug 46 into receptacle 44 continuous electrical paths are made via cable 68, to the telephone company.

In operation, a telephone interrogation signal is placed on the incoming telephone cable 68 which is connected through to the interrogation apparatus 118, 120 and 122. The interrogation apparatus can determine which meter is being selected by the signal appearing thereon. Once the meter has been selected, the interrogation device will provide the reading of the meter being monitored by either providing a digital code or place an impedance across the line, is sensed by a sensing device, not shown, at the other end of the telephone line where the interrogation signal was placed on the telephone line and the reading is noted. By introducing a new interrogation signal onto the telephone line, the next interrogation unit then reacts in the same manner and its utility meter provides a different signal or impedance across the telephone line which is to be noted at the source of the interrogation signal. This may be repeated any number of times for any number of meters and the source of the interrogation signal records the information obtained at that end. If for any reason the signals are not received in the proper manner or completely erroneous results are obtained, there will be an indication that there is trouble on the telephone line or in the the interrogation equipment. Once a determination is made as to where on the line the problem has occurred, it can be determined if a service person is required to appear at the subscriber's home or facility to determine whether the interrogation device or meters are defective.

In order to isolate the utility meters 60, 62 and 64 and the wire connections thereto made, via cable 66; from the telephone line connection, which is made, via the cable 68, the terminals 52, 54, 56 and 58, test cable 48 and plug 46; it only requires the removal of plug 46 from the receptacle 44.

An operating telephone, not shown, may be inserted into receptacle 44, thereby providing a means for checking the telephone line at the receptacle 44 of the interface 10. If the telephone may be utilized in a normal manner, then it is known that the telephone lines coming in, via cable 68, are in proper working order and the trouble in the system is somewhere after the receptacle 44 en route to the utility meters 60, 62 and 64. Thus one may readily determine whether a service call is needed at the installation or whether trouble shooting on the telephone incoming lines are required.

Hereinbefore has been disclosed an inexpensive, simply installed, utility meter to telephone line interface which provides a convenient means of isolating and determining if problems are occurring in the utility meter monitoring circuit or the telephone subscriber telephone line. It will be understood that various changes in the details, materials, arrangement of parts and operating conditions which have been herein described and illustrated in order to explain the nature of the invention may be made by those skilled in the art within the principles and scope of the present invention.

Having thus set forth the nature of the invention, what is claimed is:

1. A utility meter to telephone line interface comprising:
   (a) a hollow housing having a closed end and a major open end;
   (b) a cover adapted to cooperate with said housing major open end, said cover being hingedly connected to said housing along one edge of said housing major open end;
   (c) a first opening in said housing adapted to receive at least one subscriber telephone line pair and one utility meter line pair;
   (d) a removable terminal block disposed within said hollow housing, said terminal block having;
      (i) an integrally molded telephone receptacle housing provided with a through opening having a first open end and a second open end, said receptacle housing being adapted to receive and removably retain a mating telephone plug having conductive pins disposed on the distal end of a plug-in telephone line cord having at least two terminals in said first open end and a pin carrier block having a plurality of conductor pins disposed in said second open end, said receptacle housing being adapted to hold said conductor pins in electrically conductive contact with said telephone plug conductive pins when said pin carrier block and said telephone plug are mated,
      (ii) connection means for electrically connecting at least two of said receptacle conductor pins to at least a pair of telephone station line terminals disposed on the rear surface of said terminal block adapted to receive said at least one subscriber telephone line pair,
      (iii) at least two utility line terminals disposed in said terminal block, said utility line terminals being adapted to receive said at least one utility meter line pair,
      (iv) first cable connection means having a plurality of line pairs therein, each one of said line pairs being connected to a pair of utility meter terminals, the other distal ends of said line pairs being connected to a pair of utility line terminals disposed on said terminal block, and
      (v) second cable connection means having a plurality of line pairs therein, one end of each of said line pairs being connected to respective pairs of utility terminal pairs, the other end of said second cable connection means terminating in a telephone plug so that when said plug is placed in said receptacle said telephone line pairs are continued; and
   (e) a lip having an opening therein extending from an edge of said housing major opening; and (f) a lip having an opening therein extending from said hinged cover that aligns with said lip opening when said hinged cover is in the closed position.

2. A utility meter to telephone line interface according to claim 1 further including locking means adapted to cooperate with the lip openings provided on said cover and said housing major opening.

3. A utility meter to telephone line interface according to claim 1 further including cooperating weather seal means disposed about the edge of said housing opening and the periphery of said cooperating cover for substantially sealing said housing.

4. A utility meter to telephone line interface according to claim 1 wherein said terminal block further includes:
   (a) an L-shaped opening adapted to receive a second cable;
   (b) protruding portion means disposed proximate one leg of said L-shaped opening for retaining said second cable, and
   (c) a pin carrier block opening, said opening being provided with a plurality of channels adapted to receive a portion of said conductor pins.

5. A utility meter to telephone line interface according to claim 2 further including a pin carrier block, said carrier block including:
   (a) a plurality of parallel through apertures adapted to receive said conductor pins therein extending from the front face of said pin carrier block to the rear face of said pin carrier block;
   (b) a plurality of parallel channels extending from the front face of said pin carrier block to the rear face of said pin carrier block, said channels being adapted to receive said conductor pins, said conductor pins being adapted to extend beyond said front face when inserted into said through apertures from said rear face of said pin carrier block and extend upwardly out of said apertures and into corresponding channels at approximately 90 degrees and are further bent in a downwardly direction at approximately 45 degrees from said front surface.

6. A utility meter to telephone line interface according to claim 5 further including pictorial indicia disposed on said cover to indicate the position for connecting the lines of each type of utility meter.

7. A utility meter to telephone line interface according to claim 1 further comprising:
   (a) interrogation circuit means disposed proximate each utility meter connected between said second cable and each said utility meter for permitting each utility meter to be interrogated one at a time, and
   (b) means for activating each said interrogation circuit means upon a specific unique electrical signal appearing upon said at least one subscriber telephone line.

* * * * *